United States Patent [19]
Kuwahara et al.

[11] Patent Number: 5,394,431
[45] Date of Patent: Feb. 28, 1995

[54] APPARATUS FOR PREVENTING DUST ACCUMULATION IN EXHAUST DUCT OF AN ELECTRIC FURNACE

[75] Inventors: Yoriyuki Kuwahara; Hideki Terashima; Yoshiyasu Hikosaka; Yoshihiro Hanai; Mitsuyoshi Kishita, all of Toyohashi, Japan

[73] Assignee: Topy Kogyo Kabushiki Kaisha, Tokyo, Japan

[21] Appl. No.: 145,163

[22] Filed: Nov. 3, 1993

[30] Foreign Application Priority Data

Nov. 4, 1992 [JP] Japan .................................. 4-295343
May 27, 1993 [JP] Japan .................................. 5-126035

[51] Int. Cl.⁶ .............................................. F27D 17/00
[52] U.S. Cl. .................................. 373/8; 373/77; 373/80; 266/144
[58] Field of Search ................ 373/2, 8, 9, 79, 80, 373/77; 266/144, 148, 149

[56] References Cited

U.S. PATENT DOCUMENTS 2,684,392 7/1954 Moore ........................ 373/9
3,173,980 3/1965 Hysinger ..................... 373/8
3,900,696 8/1975 Tress et al. ................. 373/80

FOREIGN PATENT DOCUMENTS 0187861 7/1986 European Pat. Off. .
0495694 7/1992 European Pat. Off. .
1546202 10/1968 France .
2619897 3/1989 France .
1110074 6/1961 Germany .
3510723 10/1985 Germany .

Primary Examiner—Bruce A. Reynolds
Assistant Examiner—Tu Hoang
Attorney, Agent, or Firm—Cushman, Darby & Cushman

[57] ABSTRACT

A smoke suction duct of an electric furnace is constructed as a separate member from other exhaust duct portions and other devices and is supported to be rotatable about an axis of the duct. Further, the smoke suction duct is either alternately turned to right and left or continuously turned in one direction by a duct turning device. Since accumulating dust is raised to an upper portion of the smoke suction duct where an exhaust gas flow has a high velocity due to rotation of the smoke suction duct and is pushed toward a combustion tower by the exhaust gas flow, dust is advantageously prevented from accumulating on a bottom of the smoke suction duct.

17 Claims, 5 Drawing Sheets

EXHAUST GAS →

EXHAUST GAS

1

APPARATUS FOR PREVENTING DUST ACCUMULATION IN EXHAUST DUCT OF AN ELECTRIC FURNACE

BACKGROUND OF THE INVENTION

1. Field of the Invention

The present invention relates to an apparatus for preventing dust accumulation in an exhaust duct of an electric furnace, and more particularly, relates to an apparatus for preventing dust in the exhaust gas from the electric furnace from accumulating on an inside surface of a portion of an exhaust duct which extends substantially horizontally from the electric furnace to a vertical combustion tower.

2. Description of Related Art

As illustrated in FIG. 1, exhaust gas from an electric furnace 2 is moved through a combustion tower 4 for burning carbon monoxide, preheaters 6 arranged in parallel with each other for preheating metal scraps, and a gas cooler 8, a dust sedimentation tower 10, a blower 12, and spray cooling towers 16 and 18, to a bag chamber of a direct suction dust collector 14, and is then exhausted to atmosphere after purified.

In a conventional exhaust gas purification apparatus, a portion of the exhaust duct between the electric furnace 2 and the combustion tower 4, (i.e., a smoke suction duct 24) is constructed as shown in FIGS. 2 and 3. More particularly, a furnace top elbow 22 is fixed to a furnace cap 20 of the electric furnace 2. The elbow 22 is connected with the combustion tower 4 via smoke suction duct 24 which is substantially horizontal. The smoke suction duct 24 is a fixed member. To allow the furnace cap 20 and the elbow 22 to be moved away from the electric furnace 2 in a horizontal direction when molten metal is taken out from the furnace, the elbow 22 and the smoke suction duct 24 must be separated. Thus, the smoke suction duct 24 is detachably connected to the elbow 22 via a slide duct 26 which is slidable in an axial direction relative to the smoke suction duct 24 away from the elbow 22.

In the conventional apparatus, when exhaust gas from the electric furnace 2 flows through the smoke suction duct 24 to the combustion tower 4, dust in the exhaust gas is separated from gas and accumulates on an inner surface of the smoke suction duct 24, which reduces the cross-sectional area of the duct. To remove the accumulated dust from the smoke suction duct 24, a hatch 28 is provided in a wall of the combustion tower 4. When operation of the furnace 2 is stopped, a scraper is inserted through the hatch 28 into the smoke suction duct 24 and the accumulated dust is scraped by the scraper into the combustion tower 4.

However, there are the following problems with the conventional dust removal:

First, it is necessary to provide a particular dust removing device, such as a scraper, which results in an increase in equipment cost.

Second, it is necessary to provide a relatively large space for using and storing the dust removing device, resulting in an increase in size of the factory.

Third, since the walls of the combustion tower and the smoke suction duct have a cooling water jacket, providing the hatch in the wall of the combustion tower makes the cooling water jacket structure complicated and makes connecting and disconnecting of a water hose to the jacket more difficult.

Fourth, since the electric furnace is in a stopped condition during dust removal, the operation efficiency of the electric furnace is decreased.

Fifth, since the hatch is located opposite the smoke suction duct, an exhaust gas flow from the duct collides with the hatch. Due to thermal shock and abrasion by dust flow, the cooling jacket of the hatch may deteriorate and water leakage may occur.

SUMMARY OF THE INVENTION

An object of the invention is to provide an apparatus for preventing dust from accumulating on the interior of a smoke suction duct of an electric furnace.

The above-described object is achieved by an apparatus for preventing dust accumulation in an exhaust duct of an electric furnace in accordance with the invention, wherein a smoke suction duct is separately constructed from other exhaust duct portions and is rotatably supported about an axis of the smoke suction duct. A turning device is provided for rotating the smoke suction duct about the axis of the duct, either alternately in left and right directions or in one direction.

In the apparatus of the invention, dust is prevented from accumulating on an interior surface of the smoke suction duct in the following ways:

More particularly, exhaust gas flow from the electric furnace is biased radially outward at the turn of the elbow and therefore flows faster at an upper portion of the cross-sectional area of the smoke suction duct than at a lower portion thereof. When the dust accumulating on a bottom inside surface of the smoke suction duct is raised by rotating the smoke suction duct about the axis thereof, the raised dust is pushed progressively downstream by the strong exhaust gas flow in the upper portion of the cross-sectional area of the smoke suction duct, toward the combustion tower. Further, the dust raised from a first portion of the bottom inside surface of the smoke suction duct will slip and/or drop to a second portion of the bottom inside surface of the smoke suction duct located downstream of the first portion. Due to repeatedly raising and slipping and/or dropping the dust, the dust moves toward the combustion tower. When the dust finally reaches the combustion tower, the dust falls to the bottom of the combustion tower.

BRIEF DESCRIPTION OF THE DRAWINGS

The above-described object and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
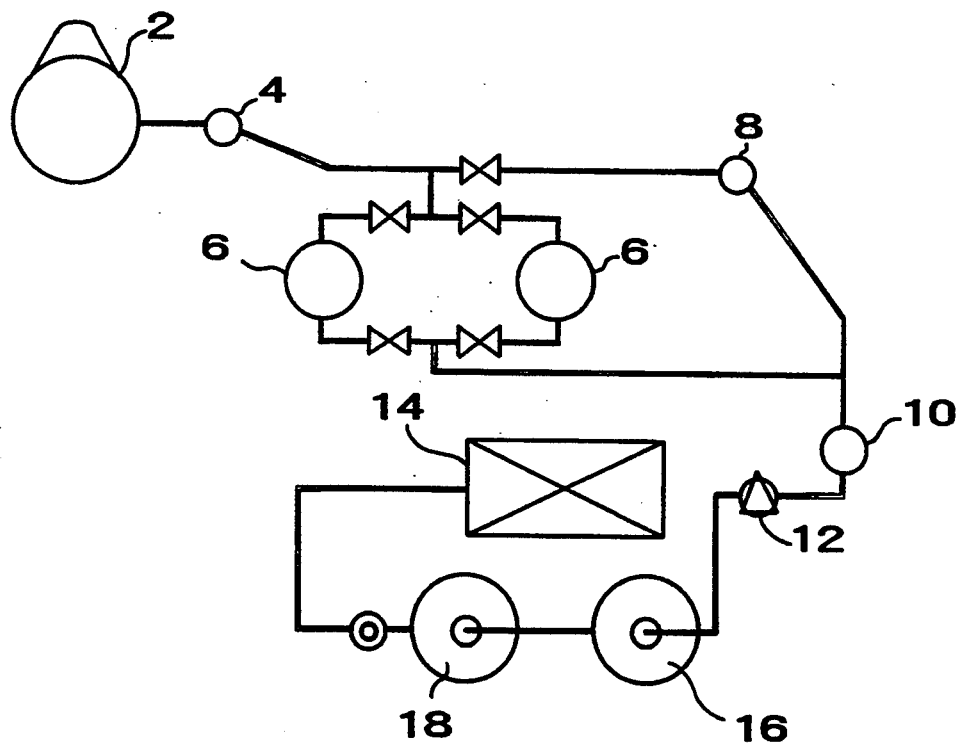
FIG. 1 is a schematic system diagram of a conventional exhaust gas treatment system of an electric furnace.
Figure 2:
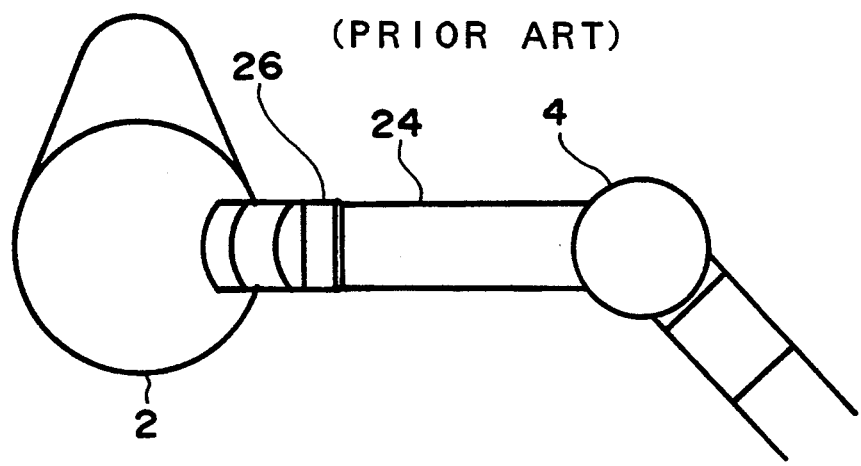
FIG. 2 is a plan view of a portion of the exhaust gas treatment system adjacent to a smoke suction duct of the apparatus of FIG. 1.
Figure 3:
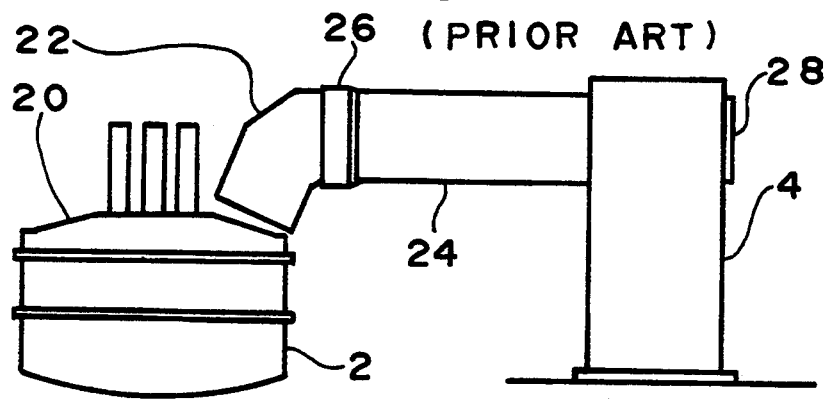
FIG. 3 is front view of the apparatus of FIG. 2.
Figure 4:
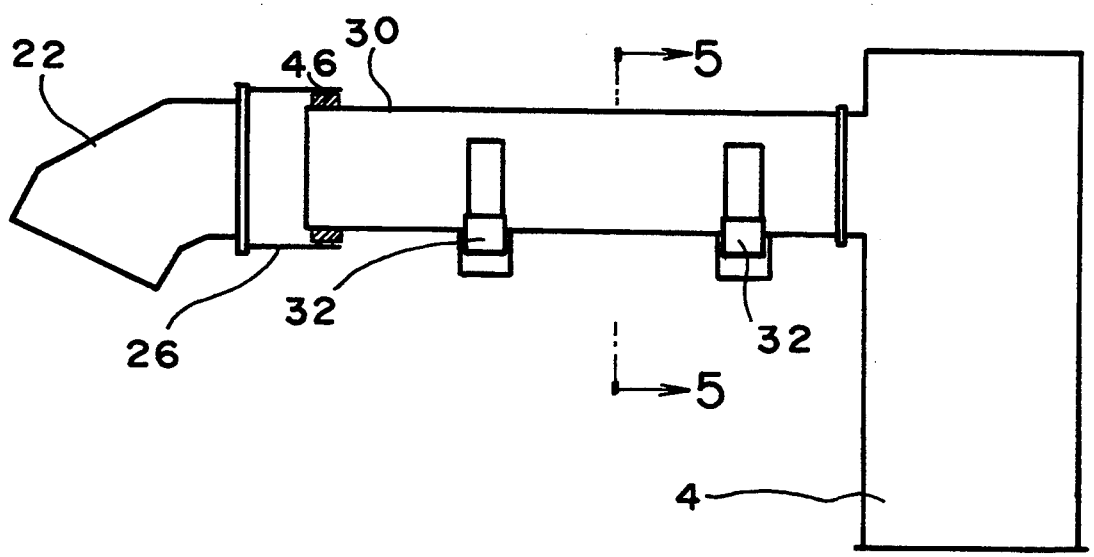
FIG. 4 is a front view of an apparatus for preventing dust accumulation in a smoke suction duct of an electric furnace in accordance with the present invention.
Figure 5:
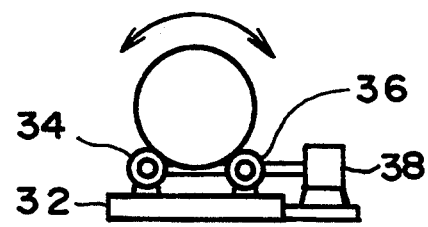
FIG. 5 is a cross-sectional view of the apparatus of FIG. 4 taken along line 5—5.
Figure 6:
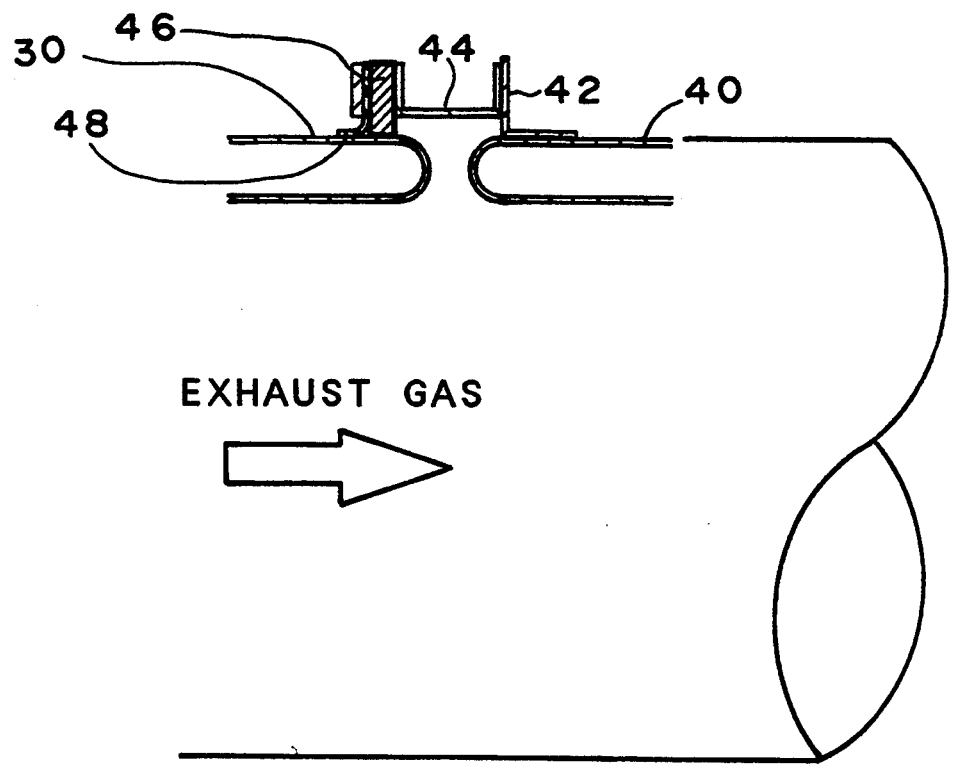
FIG. 6 is an enlarged, cross-sectional view of a connecting portion of the smoke suction duct with a combustion tower of the apparatus of FIG. 4.
Figure 7:
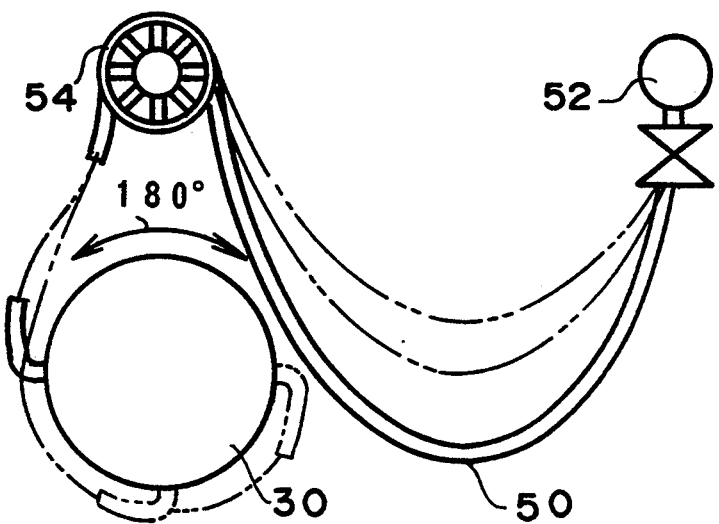
FIG. 7 is a front view of a cooling water supply and drain device for use in an apparatus for preventing dust accumulation in accordance with a first embodiment of the present invention.
Figure 8:
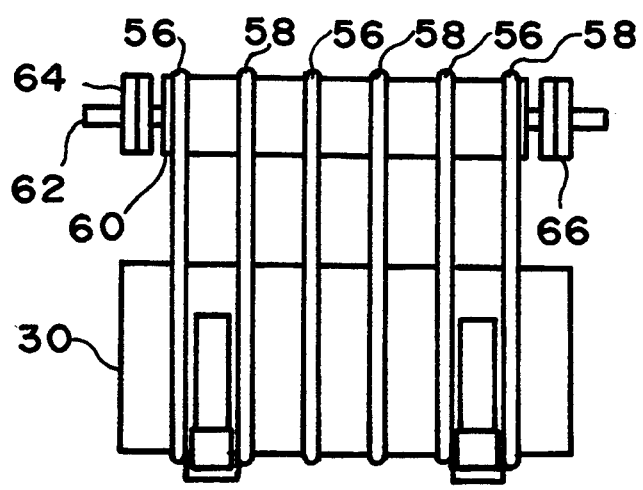
FIG. 8 is a side view of a cooling water supply and drain device for use in an apparatus for preventing dust accumulation in accordance with a second embodiment of the invention.
Figure 9:
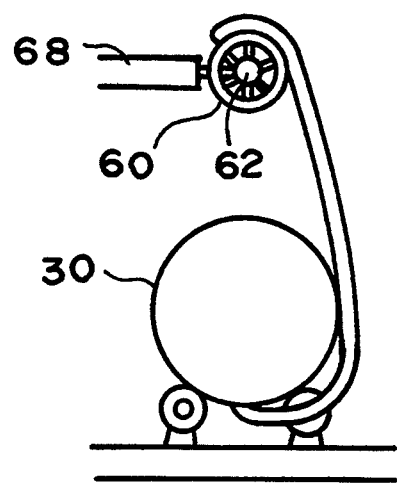
FIG. 9 is a front view of the apparatus of FIG. 8.
Figure 10:
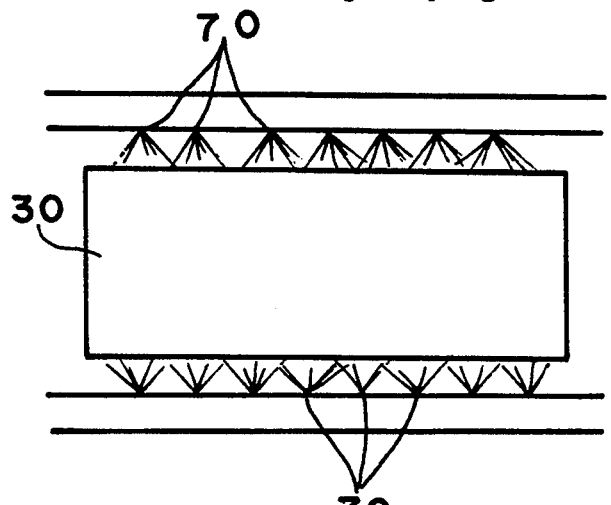
FIG. 10 is a side view of a cooling water supply and drain device for use in an apparatus for preventing dust accumulation in accordance with a third embodiment of the invention.
Figure 11:
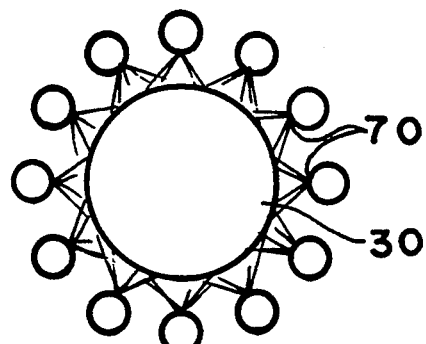
FIG. 11 is a front view of the apparatus of FIG. 10.

Three preferred embodiments of the invention will be explained with reference to the drawings. FIGS. 4-6 illustrate structures common to first through third embodiments of the invention, FIG. 7 illustrates a cooling structure used in an apparatus in accordance with the first embodiment of the invention, FIGS. 8 and 9 illustrate a cooling structure used in an apparatus in accordance with the second embodiment of the invention, and FIGS. 10 and 11 illustrate a cooling structure used in an apparatus in accordance with the third embodiment of the invention.

First, structures common to all the embodiments of the invention will be explained.

In FIG. 4, reference numeral 22 denote a furnace top elbow 22 which is a member fixed to a top cap of an electric furnace. It can be horizontally moved away from above the electric furnace together with the top cap, when metal scraps are put in the furnace and when molten metal is taken out of the furnace. Also, reference numeral 4 denotes an upper portion of a combustion tower 4 which is a fixed member. A hatch for allowing a scraper to pass therethrough is not provided in a wall of the combustion tower 4 according to the present invention. Such a scraper is not necessary to be provided in the apparatus of the present invention.

A smoke suction duct 30 extends substantially horizontally between the furnace top elbow 22 and the combustion tower 4. Unlike the conventional apparatus, the smoke suction duct 30 is constructed separately from the combustion tower 4 and also from the elbow 22 which is movable in a horizontal direction. The smoke suction duct 30 is rotatably supported about an axis of the smoke suction duct 30. The smoke suction duct 30 is usually a large member having a diameter of about 2,200 mm and a length of about 5,700 mm, though the dimensions may change depending on the capacity of the electric furnace. A slide duct 26 is supported at an end of the elbow side of the smoke suction duct 30 so as to be movable in an axial direction. The slide duct 26 is disconnected from the furnace top elbow 22, and is moved away from the furnace top elbow 22, before the furnace top elbow 22 is moved in the horizontal direction together with the furnace cap of the electric furnace. After the furnace cap is shut, the slide duct 26 is moved toward the furnace top elbow 22 and then coupled to the elbow.

As illustrated in FIGS. 4 and 5, the smoke suction duct 30 is rotated about its axis by a duct turning device 32 which includes a duct support for supporting the smoke suction duct 30 about its axis and including a plurality of rollers 34 and 36 for supporting the smoke suction duct 30 thereon, and a duct drive device including an electric motor 38 for driving at least one of the rollers 34 and 36.

In the embodiment shown in FIG. 4, the duct support of the turning device 32 supports the smoke suction duct 30 at two positions in the longitudinal direction thereof, and at each position the duct support has two rollers 34 and 36 which are driven by the motor 38 through a shaft. The duct support could, of course, support the smoke suction duct at more or less than two positions.

In the first and the second embodiments of the invention, as illustrated in FIG. 5, the smoke suction duct 30 is alternately rotated to the right and the left. The rotational angle $\theta°$ from a center to each of the right and the left is determined from the viewpoint of lifting dust accumulated on the bottom of the duct to a portion where the exhaust gas flow velocity is high. More particularly, the angle $\theta°$ is preferably in the range of 45°–180°, for example, 90°. In order to drive the smoke suction duct 30 to right and left as described above, the drive motor 38 is a reversible motor.

In the third embodiment, the smoke suction duct 30 is continuously rotated in one direction. The wall of the smoke suction duct 30 is cooled to decrease the exhaust gas temperature.

However, the supply and exhaust structure of cooling water in the first and second embodiments, where the smoke suction duct is alternately turned to the right and the left, is different from that of the third embodiment, where the smoke suction duct 30 is continuously rotated in one direction.

Sealing structure between the smoke suction duct 30 and the combustion tower 4 and the slide duct 26 must be sealable while still allowing the smoke suction duct 30 to rotate.

More particularly, as illustrated in FIG. 6, the seal between the smoke suction duct 30 and the combustion tower 4 includes an angle 42 fixed to the combustion tower side duct 40, a channel 44 extending toward the smoke collecting duct 30 and fixed to the angle 42, a packing 46 (constructed of heat-resisting material such as glass fibers) fixedly supported by the channel 44 so as to be slidable with respect to an outside surface of the smoke suction duct 30, and a flexible seal 48 (constructed of cloth or rubber) supported by the channel 44 together with the packing 46 so as to be slidable relative to the smoke suction duct 30 in a circumferential direction of the duct 30. Since the combustion tower duct 40 and the smoke suction duct 30 are manufactured from a steel plate by bending and welding, they usually have some dimensional variation therebetween. As a result, when the smoke suction duct 30 is rotated, a gap may occur between the combustion tower duct 40 and the smoke suction duct 30, which is compensated for by deformation of the packing 46 and the flexible seal 48.

Figure 12:
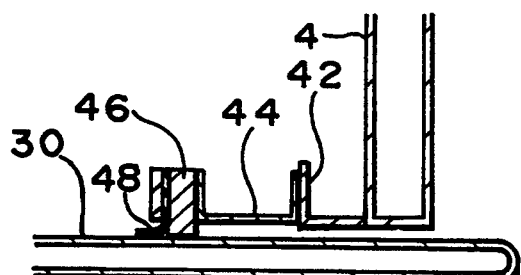
FIG. 12 is an enlarged, cross-sectional view of another structure, different from that of FIG. 6, of a connecting portion between the smoke collecting duct with the combustion tower of the apparatus of FIG. 4.
Figure 12:
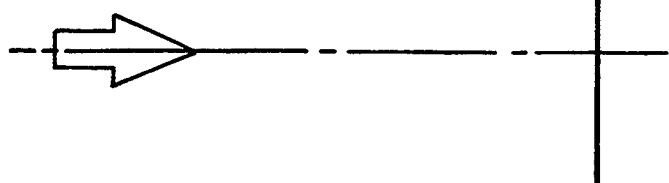

The sealing structure of FIG. 6 between the rotatable smoke suction duct 30 and the fixed combustion tower 4 may be replaced by the structure shown in FIG. 12. In the sealing structure of FIG. 12, the smoke suction duct 30 extends within the combustion tower 4, so the combustion tower side duct 40 of the sealing structure of FIG. 6 is not provided here. A seal is provided between an outside surface of a side wall of the combustion tower 4 and the smoke suction duct 30. The seal, like the structure of FIG. 6, includes an angle 42 fixed to the combustion tower 4, a channel 44 fixed to the angle 42 and having a cross-section extending away from the side wall of the combustion tower 4, a packing 46 attached to the channel 44 so as to be slidable relative to the outside surface of the smoke suction duct 30, and a flexible seal 48 fixed to the channel 44 together with the packing 46 so as to be slidable relative to the outside surface of the smoke suction duct 30. The structure of FIG. 12, which does not have a fixed combustion tower side duct 40 as in FIG. 6, is superior to that of FIG. 6 because dust does not accumulate on a bottom surface of the combustion tower side duct 40.

The seal between the smoke suction duct 30 and the slide duct 26 includes a packing 46 (constructed of the same kind material as the packing 46 described above) wound around the smoke suction duct 30 which slidably supports the slide duct 26 in the axial direction of the smoke suction duct. Any gaps between the smoke suction duct 30 and the slide duct 26 caused when the smoke suction duct is rotated are compensated for by a deformation of the packing 46.

Further, in order to allow dust to be efficiently conveyed toward the combustion tower 4, the smoke suction duct 30 may be inclined with an inclination of 1/30 to 1/50 with respect to the horizontal so as to slope downwardly toward the combustion tower 4.

The cooling structure for the the smoke suction duct 30 varies according to each embodiment of the invention.

In the first embodiment of the invention, the smoke suction duct 30 has a hollow-wall structure having a cooling water jacket through which cooling water is circulated. In the first embodiment, since the smoke suction duct 30 is not rotated continuously in one direction, supply and drain of the cooling water to and from the hollow wall can be conducted through a flexible hose 50. For example, one end of the flexible hose 50, as shown in FIG. 7, is connected to the smoke suction duct 30 and the other end is connected to a cooling water header 52. FIG. 7 shows a water supply header only, but the a water exhaust header is provided in the same as the water supply header. A drum 54 for supporting an intermediate portion of the hose and for preventing the hose from being twisted is also provided.

In order to prevent the hose from sagging more surely, the structures of the second embodiment of the invention shown in FIG. 8 and 9 can be used. More particularly, as illustrated in FIG. 8, a flexible water supply hose 56 and a flexible water drain hose 58 are arranged alternately and connected to the hollow wall of the smoke suction duct 30 which is sectioned in a longitudinal direction of the duct. One water supply hose and one water drain hose are connected to each section of the smoke suction duct 30. Further, each water supply hose and each drain hose is wound around a drum 60, and are fluidly connected to a water supply and drain pipe 62 disposed inside the drum 60. The interior of the water supply and exhaust pipe 62 is divided into two chambers by a partition extending in the diametrical direction, one chamber of which supplies water and the other of which drains water. A swivel joint 64 for supplying water is provided at one end of the water supply and exhaust pipe 62, and a swivel joint 66 for draining water is provided at the other end thereof. The swivel joint 64 for supplying water allows water to flow from the supply water header into the water supply chamber through a hose 68 and the swivel joint 66 for draining water allows the cooling water to flow from the chamber for exhausting water from the water drain chamber to a hose communicating with the water drain header. The structure of the swivel joint itself is well known.

In the third embodiment of the invention, since the smoke suction duct 30 is continuously rotated in one direction, in order to prevent the hose from being twisted, the cooling water is injected against the smoke suction duct from one or more fixed nozzles disposed outside the smoke suction duct without using a wound and released hose. As illustrated in FIGS. 10 and 11, the smoke suction duct 30 has a single-wall structure, and nozzles 70 for injecting cooling water onto an exterior of the smoke suction duct 30 are provided outside the smoke suction duct 30. The cooling water may be allowed to fall from an upper side of the smoke suction duct 30.

Operation of the present invention will now be explained.

When exhaust gas from the electric furnace flows through the rotating smoke suction duct 30, a portion of dust falls onto the bottom of the smoke suction duct 30 and accumulates there. The accumulating duct is lifted by the rotation of the suction duct 30 to an upper portion of the cross section of the duct where the velocity of the exhaust gas is faster than at a lower portion of the cross section due to the upward flow velocity biasing caused by the furnace top elbow 22. The dust, thus effectively pushed by the exhaust gas, flow toward the combustion tower 4, and finally reaches the combustion tower where the dust falls to a bottom of the combustion tower 4.

Further, when the dust is raised due to the rotation of the duct, the dust also drops or slips along an inside surface of the duct due to the gravity. When the dust slips, the dust is pushed by the exhaust gas flow, so that the dust is efficiently carried toward the combustion tower 4 and finally falls to the bottom of the combustion tower 4.

Accordingly, in the present invention, the dust is prevented from accumulating on the bottom of the smoke suction duct 30, and obviates using a dust removing device such as a scraper used in the conventional apparatus.

Eliminating the need for a dust removing device makes it unnecessary to provide additional space for conveying and installing a dust removing device and the like, so that various advantages such as decrease in cost and downsizing of the overall apparatus are obtained. Although rotating the smoke suction duct 30 is accompanied by difficulties in the supply and drain of cooling water, supply and drain of cooling water can be conducted surely and reliably by using any one structure of the first through third embodiments of the present invention.

In accordance with the present invention, since the smoke suction duct is separate segment from other portions of the exhaust duct and is rotated, dust is prevented from accumulating on the bottom of the smoke suction duct.

Although a few embodiments of the invention have been described in detail above, it will be appreciated by those skilled in the art that various modifications and alterations can be made to the particular embodiments shown without materially departing the novel teachings and advantages of the present invention. Accordingly, it is to be understood that all such modifications and alterations are included within the spirit and scope of the invention as defined by the following claims.

What is claimed is:

1. An apparatus for preventing dust accumulation in an exhaust duct between an electric furnace and a combustion tower, comprising:
   a rotatable smoke suction duct extending between a hollow elbow portion fixed to the electric furnace and the combustion tower of the electric furnace;
   a turning device for rotating the smoke suction duct about an axis of the smoke suction duct, including a duct support for supporting the smoke suction duct rotatably about the axis of the smoke suction duct and a drive device for rotating the smoke suction duct; and
   a seal for establishing a sealed connection between the smoke suction duct and the combustion tower, the seal comprising:
   a first member fixed to the combustion tower;
   at least one second member fixedly coupled to the first member;
   a packing coupled to the at least one second member to cover a clearance between an outer surface of the smoke suction duct and the at least one second member; and
   a flexible sealing cloth coupled to the at least one second member together with the packing and having a portion slidably contacting an outer surface of the smoke suction duct.

2. An apparatus according to claim 1, wherein the drive device of the turning device comprises a device which rotates the smoke suction duct alternately in one direction and another.

3. An apparatus according to claim 1, wherein the drive device of the turning device comprises a device which rotates the smoke suction duct in one direction.

4. An apparatus according to claim 1, wherein the smoke suction duct is inclined at an inclination of 1/30–1/50.

5. An apparatus according to claim 1, wherein the at least one second member comprises:
   an angle portion fixedly coupled to the first member fixed to the combustion tower; and
   a channel fixedly coupled to the angle portion.

6. An apparatus according to claim 1, further comprising a slidable duct via which the smoke suction duct is detachably coupled to the elbow, the slidable duct being slidable with respect to the smoke suction duct in an axial direction of the smoke suction duct.

7. An apparatus according to claim 1, wherein the smoke suction duct has a hollow wall having a cooling water jacket structure therein.

8. An apparatus according to claim 7, further comprising a flexible hose having a first end connected to the hollow wall of the smoke suction duct and a second end connected to a fixed cooling water header.

9. An apparatus according to claim 7, further comprising a flexible hose having a first end connected to the hollow wall of the smoke suction duct and a second end connected via a swivel joint to a hose winding-up drum.

10. An apparatus according to claim 1, wherein the smoke suction duct has a single solid wall.

11. An apparatus according to claim 10, further comprising at least one cooling water nozzle, located outside the smoke suction duct, for injecting cooling water against the smoke suction duct.

12. An apparatus according to claim 1, wherein the smoke suction duct extends into an interior of the combustion tower.

13. An apparatus for preventing dust accumulation in an exhaust duct between an electric furnace and a combustion tower, comprising:
   a rotatable smoke suction duct extending substantially horizontally between a hollow elbow portion fixed to the electric furnace and the combustion tower, the smoke suction duct having a hollow wall having a cooling water jacket structure therein;
   a turning device for rotating the smoke suction duct about an axis of the smoke suction duct portion, the turning device including a duct support for rotatably supporting the smoke suction duct and a drive device for rotating the smoke suction duct; and
   a flexible hose having a first end connected to the hollow wall of the smoke suction duct and a second end connected via a swiveled joint to a hose winding-up drum for providing a cooling water to said cooling water jacket structure.

14. An apparatus according to claim 13, wherein the drive device of the turning device comprises a device which rotates the smoke suction duct alternately in one direction and another.

15. An apparatus according to claim 13, wherein the drive device of the turning device comprises a device which rotates the smoke suction duct continuously in one direction.

16. An apparatus according to claim 13, wherein the smoke suction duct is inclined at an inclination of 1/30–1/50.

17. An apparatus according to claim 13, further comprising a slidable duct via which the smoke suction duct is detachably coupled to the elbow, the slidable duct being slidable with respect to the smoke suction duct in an axial direction of the smoke suction duct.

* * * * *